United States Patent
Yang et al.

(10) Patent No.: US 9,748,997 B2
(45) Date of Patent: Aug. 29, 2017

(54) ELECTRONIC DEVICE AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Jian-Jun Yang, Shenzhen (CN); Yan-Min Wang, Shenzhen (CN); Lei Wang, Shenzhen (CN); Ning Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/811,460

(22) Filed: Jul. 28, 2015

(65) Prior Publication Data

US 2016/0329923 A1    Nov. 10, 2016

(30) Foreign Application Priority Data

May 8, 2015    (CN) .......................... 2015 1 0231454

(51) Int. Cl.
| | |
|---|---|
| *G06F 1/16* | (2006.01) |
| *H04B 1/3888* | (2015.01) |
| *B22D 25/02* | (2006.01) |
| *B22D 19/04* | (2006.01) |

(52) U.S. Cl.
CPC ........... *H04B 1/3888* (2013.01); *B22D 19/04* (2013.01); *B22D 25/02* (2013.01)

(58) Field of Classification Search
CPC .............................. G06F 1/1626; G06F 1/1656
See application file for complete search history.

(56) References Cited

U.S. PATENT DOCUMENTS

| | | | | |
|---|---|---|---|---|
| 8,190,222 B2* | 5/2012 | Cheng | ................. | H04M 1/0202 220/4.02 |
| 8,442,604 B1* | 5/2013 | Diebel | ................... | G03B 17/02 361/679.32 |
| 8,561,831 B2* | 10/2013 | Liao | .................. | B29C 45/14336 220/4.01 |
| 8,655,422 B2* | 2/2014 | Stiehl | .................. | B29C 45/1676 361/730 |
| 8,694,064 B2* | 4/2014 | Kim | ........................ | H04M 1/04 455/575.1 |
| 8,879,245 B2* | 11/2014 | Kim | ..................... | H04B 1/3888 206/320 |

(Continued)

*Primary Examiner* — Anthony Q Edwards
(74) *Attorney, Agent, or Firm* — Steven Reiss

(57) ABSTRACT

An electronic device includes a housing and a base plate. The housing includes a frame. The frame includes a first end portion having a first inner surface and a second end portion connected to the first end portion to form the closed frame. The second end portion has a second inner surface. The base plate is fixedly connected to the frame. One of the first inner surface and the base plate includes a first protrusion, and the other of the first protrusion and the base plate defines a first latching slot; the first protrusion receives in the first latching slot. One of the second inner surface and the base plate includes a second protrusion, and the other of the second inner surface and the base plate defines a second latching slot, the second protrusion receives in the second latching slot.

6 Claims, 6 Drawing Sheets

(56) References Cited

U.S. PATENT DOCUMENTS

| | | | |
|---|---|---|---|
| 8,942,773 B2* | 1/2015 | Wu | A45C 11/00 |
| | | | 206/320 |
| 8,989,826 B1* | 3/2015 | Connolly | A45C 1/06 |
| | | | 361/679.01 |
| 9,370,823 B2* | 6/2016 | Wang | H05K 5/0243 |
| 2004/0097276 A1* | 5/2004 | Harmon | H04M 1/0283 |
| | | | 455/575.1 |
| 2006/0205447 A1* | 9/2006 | Park | H04M 1/0235 |
| | | | 455/575.1 |
| 2009/0114556 A1* | 5/2009 | Tai | H04M 1/185 |
| | | | 206/320 |
| 2009/0160400 A1* | 6/2009 | Woud | H02J 7/0042 |
| | | | 320/115 |
| 2016/0254836 A1* | 9/2016 | Alsberg | H04B 1/3888 |
| | | | 455/575.8 |

* cited by examiner

ELECTRONIC DEVICE AND METHOD FOR MAKING SAME

FIELD

The subject matter herein generally relates to electronic devices and a method for manufacturing the electronic devices, particularly an electronic device having a housing and a base plate assembled together and a method for making the electronic device.

BACKGROUND

Electronic devices commonly include a housing (e.g. a front cover, a back cover, and a frame) and other members such as a base plate received in the housing and integrated with the housing. The other members can be assembled to the housing by computer numerical control (CNC). However, the CNC manufacturing process often needs a relative longer manufacturing time and has a lower efficiency.

BRIEF DESCRIPTION OF THE DRAWINGS

Implementations of the present technology will now be described, by way of example only, with reference to the attached figures, wherein.

DETAILED DESCRIPTION

Figure 1:
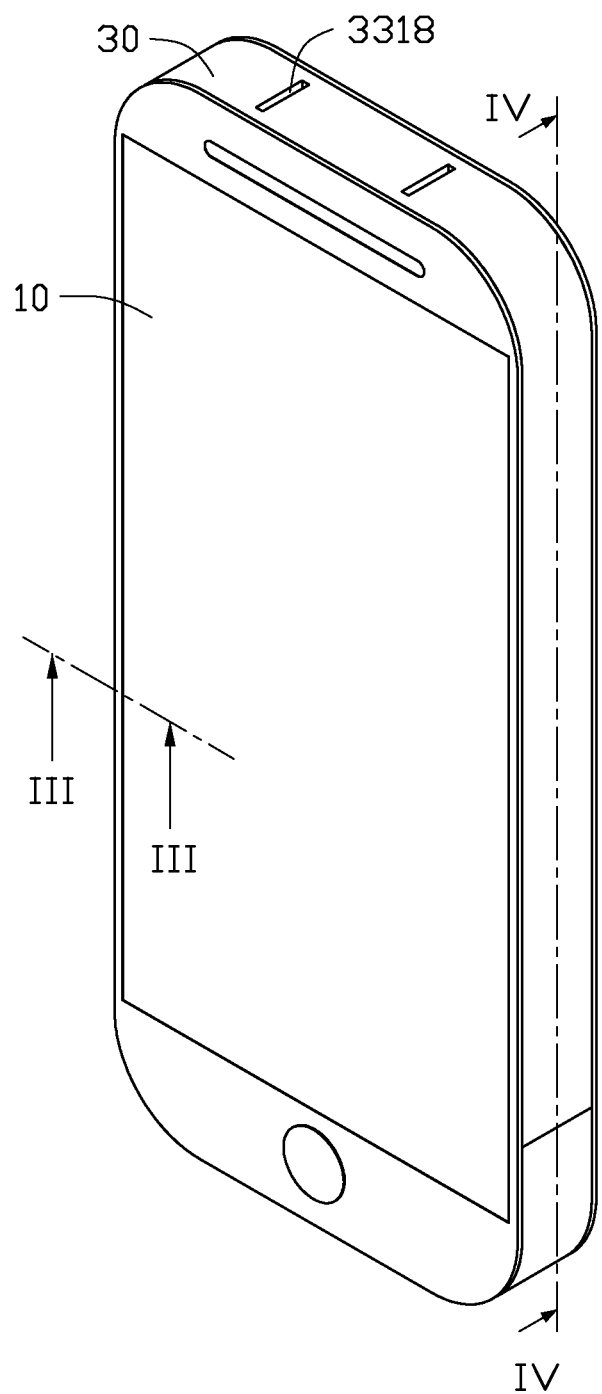
FIG. 1 is an isometric view of an electronic device, according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an isometric view of an electronic device 100, according to an exemplary embodiment. The electronic device 100 can be, but not limited to, a mobile phone, a personal digital assistant (PDA), and a tablet personal computer. In this exemplary embodiment, the electronic device 100 is a mobile phone.

Figure 2:
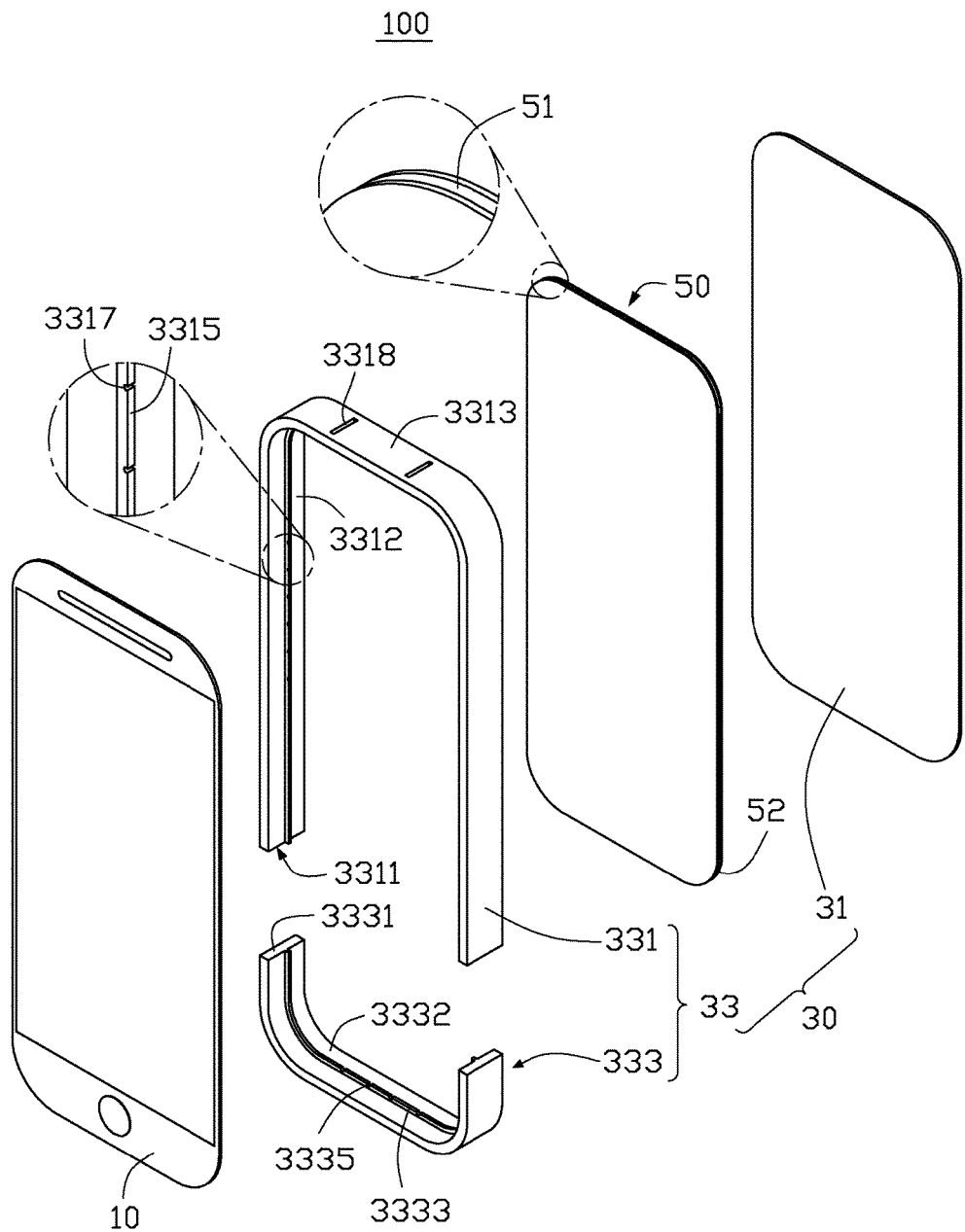
FIG. 2 is an exploded, isometric view of the electronic device of FIG. 1.

FIG. 2 illustrates that the electronic device 100 includes a window portion 10, a housing 30, and a base plate 50. The window portion 10 is assembled to the housing 30 and forms a receiving chamber with the housing 30. The receiving chamber is configured for receiving the base plate 50 and electronic elements such as a battery and an antenna.

The housing 30 includes a cover 31 and a frame 33. The cover 33 can be a back cover of the electronic device 100. The cover 31 can be made of metal, glass, or plastics.

The frame 33 includes a first end portion 331 and a second end portion 333. The first end portion 331 and the second end portion 333 are connected together to form the closed frame to ensure the integrity of the frame 33.

A shape of the frame 33 can be changed according to requirements. In this exemplary embodiment, the frame 33 is substantially rectangular. The first end portion 331 and the second end portion 333 are both substantially U-shaped. In this exemplary embodiment, a length of the first end portion 331 is longer than that of the second end portion 333. In other exemplary embodiment, the shape and the lengths of the first end portion 331 and the second end portion 333 can be changed according to the requirements. For example, the first end portion 331 and the second end portion 333 can be a substantially U-shaped structure that distal ends thereof are complementary, or can be substantially L-shaped as long as the first end portion 331 and the second end portion 333 can cooperatively joint to form the frame 33.

The first end portion 331 and the second end portion 333 are both made of stainless steel. The first end portion 331 includes two first end surfaces 3311, a first inner surface 3312, and an outer surface 3313 opposite to the inner surface 33. The first end surfaces 3311 are opposite to the second end portions 333. A first protrusion 3315 protrudes from the first inner surface 3312. At least one first connecting slot 3317 are defined in the first protrusion 3315. In this exemplary embodiment, the first protrusion 3315 is substantially U-shaped and extends from one end of the first inner surface 3312 to another end of the first inner surface 3312.

The second end portion 333 includes two second end surfaces 3331 and a second inner surface 3332. The second end surfaces 3331 are opposite to the first end surfaces 3311. A second protrusion 3333 protrudes from the second inner surface 3332. At least one second connecting slot 3335 are defined in the second protrusion 3333. In this exemplary embodiment, the second protrusion 3333 is substantially U-shaped. The second protrusion 3330 extends from one end of the second inner surface 3332 to another end of the second inner surface 3332. Two ends of the second protrusion 3333 align with those of the first protrusion 3315 when the first end portion 331 and the second end portion 333 are connected together.

Figure 3:
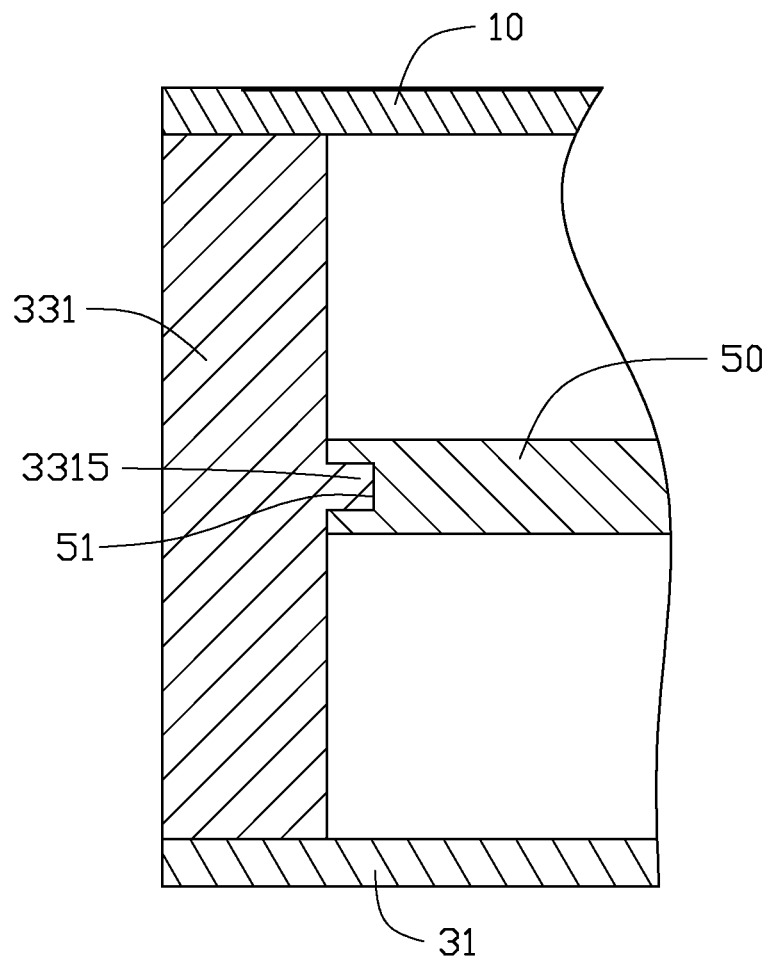
FIG. 3 is a cross-sectional view of the electronic device of FIG. 1 along line III-III.
Figure 4:
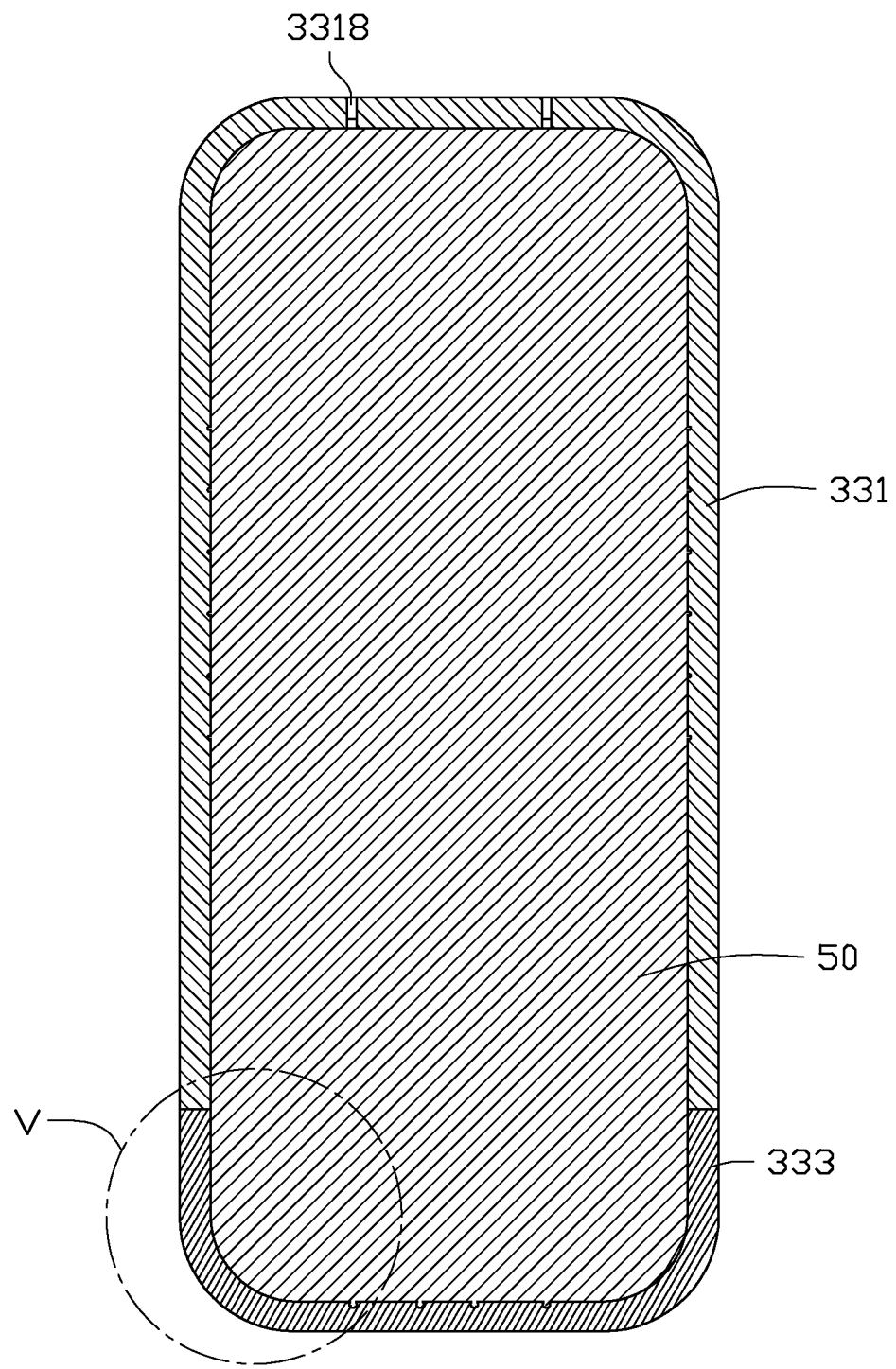
FIG. 4 is a cross-sectional view of the electronic device of FIG. 1 along line IV-IV.
Figure 5:
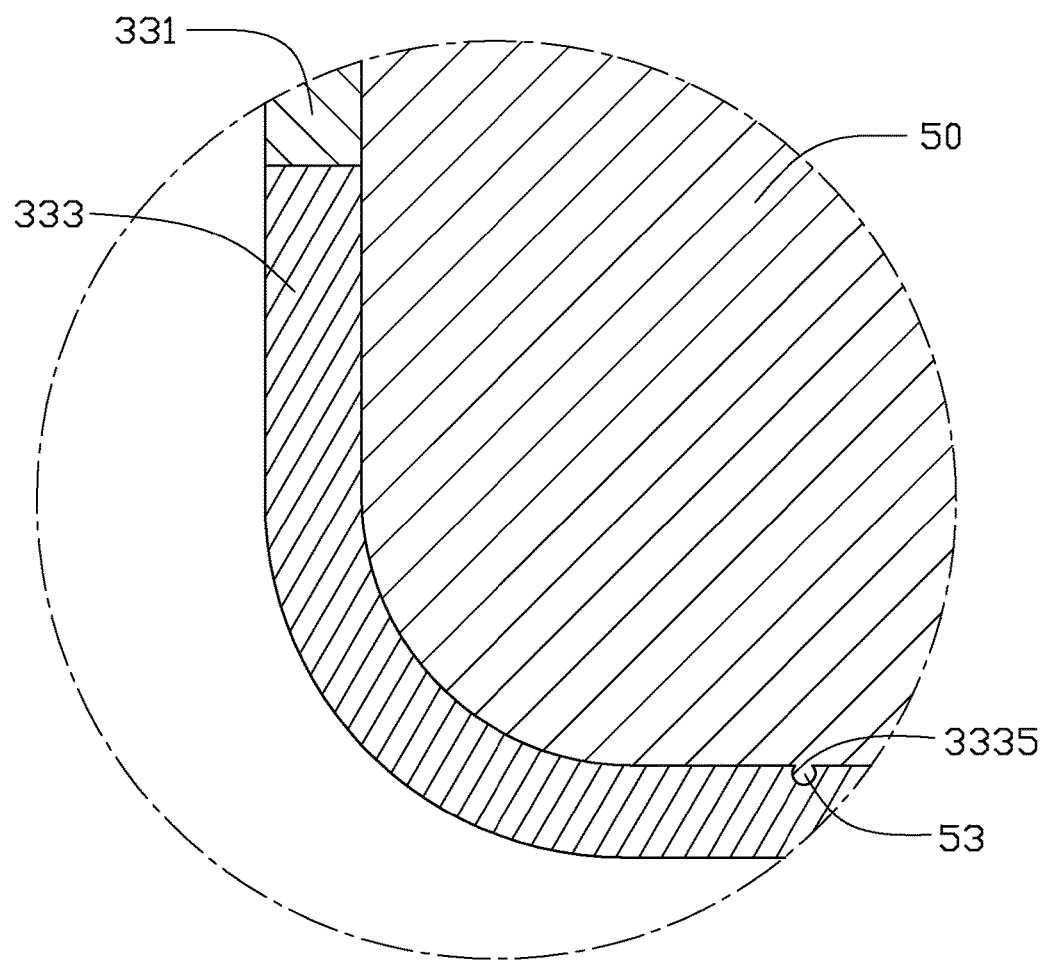
FIG. 5 is an enlarged view of the electronic device of circled portion V in FIG. 4.

FIGS. 3 to 5 illustrate that a shape of the base plate 50 is substantially U-shaped and corresponding to that of the frame 33. A first latching slot 51 and a second latching slot 52 are defined in the frame 33. In this exemplary embodiment, the first latching slot 52 and the second latching slot 51 are communicated with each other to form a ring-shaped slot. At least one embedding portion 53 respectively protrude from bottoms of the first latching slot 51 and the second latching slot 52. The first protrusion 3315 and second protrusion 3333 are respectively received in the first latching slot 51 and the second latching slot 52. The at least one embedding portion 53 are received in the at least one first connecting slot 3317 and the at least one second connecting slot 3335. As such, the base plate 50 can be stably connected to the first end portion 331 and the second end portion 333 and makes the first end portion 331 and the second end portion 333 form the closed frame.

In other exemplary embodiment, the first latching slot 51 and the second latching slot 52 can be respectively defined in the first end portion 331 and the second end portion 333. The first protrusion 3315 and the second protrusion 3333 can protrude from the base plate 50.

At least one gap 3318 is further defined in the first end portion 331 opposite to the second end portion 333. In this exemplary embodiment, there are two gaps 3318 defined in the first end portion 331. Each gap 3318 runs through the first inner surface 3312 and the outer surface 3313. Two portions of the first end portion 331 spaced by each gap 3318 can be separated from each other or connected to each other through at least one portion of the first end portion 331 adjacent to the gap 3318. In this exemplary embodiment, the two portions spaced by each gap 3318 is connected to each other through two ends of the first end portion 331 adjacent to the gap 331. A width of each gap 3318 is about 1 mm-3 mm. In this exemplary embodiment, non-conductive material can be filled into the gaps 3318.

Figure 6:
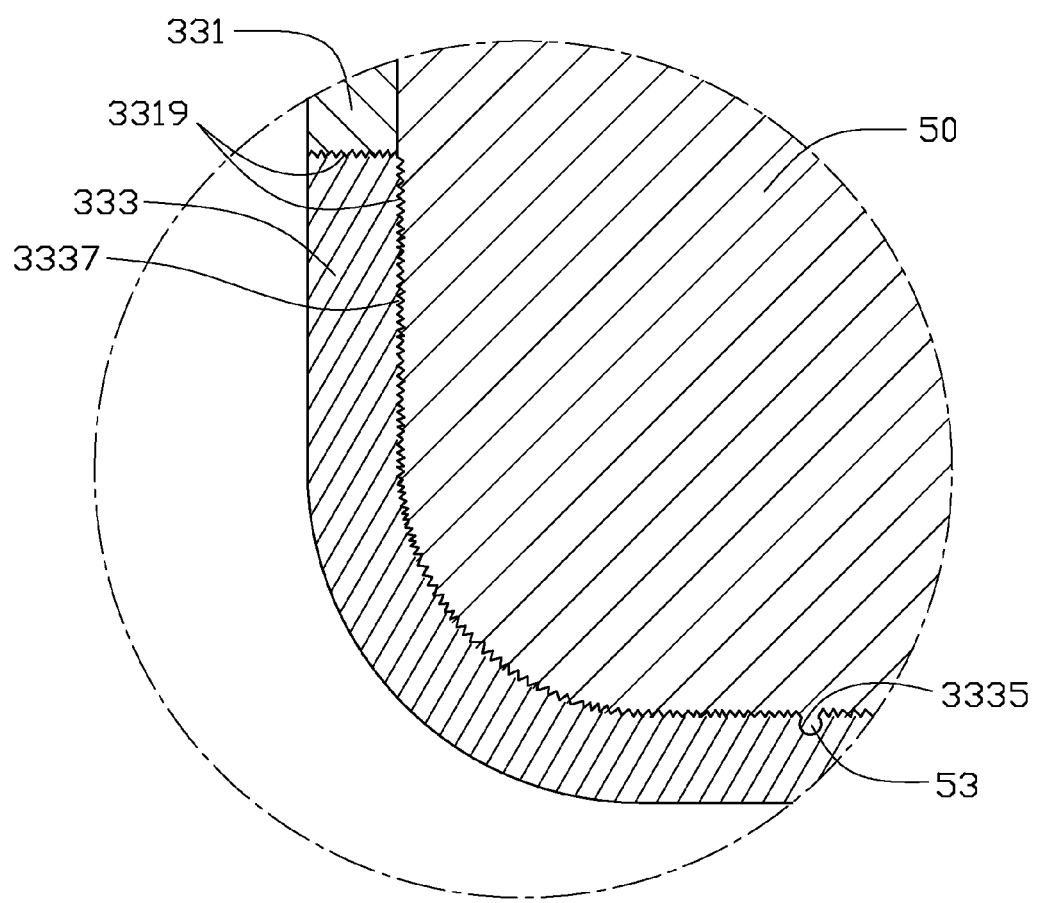
FIG. 6 is an enlarged view of a portion of an electronic device, according to a second exemplary embodiment.

FIGS. 4 and 6 illustrates that, in a second exemplary embodiment, a plurality of small holes 3319 are defined in the first end surfaces 3311 and a surface of the base plate 50 attached to the second end portion 333. A plurality of ribs 3337 protrude from the second end surfaces 3331 and the second inner surface 3332 corresponding to the small holes 3319. The ribs 3337 are embedded into and fixedly filled in the corresponding the small holes 3319, thereby making the second end portion 333 fixedly connect to the first end portion 331 and the base plate 50. The second end portion 333 is made of plastics.

An exemplary method for making the electronic device 100 of the first exemplary embodiment, can include the following steps.

A frame 33 is provided. The frame 33 includes a first end portion 331 and a second end portion 333. The first end portion 331 and the second end portion 333 are connected together to form the frame 33. The first end portion 331 and the second end portion 333 are formed by bending. The first end portion 331 includes a first inner surface 3312. A first protrusion 3315 protrudes from the first inner surface 3312. At least one first connecting slot 3317 are defined in the first protrusion 3315. The second end portion 333 includes a second inner surface 3332. A second protrusion 3333 protrudes from the second inner surface 3332. At least one second connecting slot 3335 are defined in the second protrusion 3333. The first end portion 331 and the second end portion 333 are both made of stainless steel.

A base plate 50 connected to the first end portion 331 and the second end portion 333 is formed. In this exemplary embodiment, the first end portion 331 and the second end portion 333 are placed in a casting mold (not shown) with two first end surfaces 3311 of the first end portion 331 aligning with two second end surfaces 3331 of the second end portion 333. Liquid metal is injected into a cavity of the mold to form the base plate 50 stably connected to the first end portion 331 and the second end portion 333. The first end portion 331 and the second end portion 333 combine the closed frame by the base plate 50. The metal can be magnesium or aluminum alloy. In this exemplary embodiment, a first latching slot 51 and a second latching slot 52 are defined in a surface of the base plate 50 connected to the frame 33 corresponding to the first protrusions 3315 and the second protrusions 3333. A plurality of embedding portions 53 are formed on bottoms of the first latching slot 51 and the second latching slot 52 corresponding to the first connecting slot 3317 and the second connecting slot 3335. The first protrusion 3315 and second protrusion 3333 are respectively received in the first latching slot 51 and the second latching slot 52. The embedding portions 53 are received in the first connecting slot 3317 and the second connecting slot 3335. As such, the base plate 50 and the frame are stably integrated together.

An outer surface of the frame 33 is processed by surface treatment such as physical vapor deposition (PVD) so that the frame can appear a better appearance.

A window portion 10 and a cover 31 are provided to cover two opposite sides of the frame 33 to form the electronic device 100.

An exemplary method for making the electronic device of the second exemplary embodiment, can include the following steps.

A first end portion 331 of a frame 33 is provided. The first end portion 331 is a portion of the frame 33 and is substantially U-shaped. The first end portion 331 is formed by bending. The first end portion 331 includes a first inner surface 3312. A first protrusion 3315 protrudes from the first inner surface 3312. At least one first connecting slot 3317 are defined in the first protrusion 3315. The first end portion 331 is both made of stainless steel.

A base plate 50 connected to the first inner surface 3312 of the first end portion 331 is formed. In this exemplary embodiment, the first end portion 331 is placed in a casting mold (not shown). Liquid metal is injected into a cavity of the mold to form the base plate 50 stably connected to the first end portion 331. The metal can be magnesium or aluminum alloy. In this exemplary embodiment, a first latching slot 51 is defined in a surface of the base plate 50 connected to the frame 33 corresponding to the first protrusions 3315. A plurality of embedding portions 53 are formed on bottoms of the first latching slot 51 corresponding to the first connecting slot 3317. The first protrusion 3315 is received in the first latching slot 51. The embedding portions 53 are embedded into the first connecting slot 3317. As such, the base plate 50 and the first end portion 331 stably integrated together.

An ink layer (not shown) is formed on a surface of the base plate 50 that does not contact with the frame 33. In this exemplary embodiment, ink is sprayed on the surface of the base plate 50 that dose not contact with the frame 33 and solidified to form the ink layer. The ink layer is configured for protecting the base plate 50 in subsequent manufacturing processes.

A plurality of small holes 3319 are defined in first end surfaces 3311 and a surface of the base plate 50 that not coated by the ink layer. In this exemplary embodiment, the first end surfaces 3311 and the surface of the base plate 50 that not coated by the ink layer are processed by solution impregnation, electrochemical corrosion, chemical corrosion. As such, the plurality of small holes 3319 are defined in the first end surfaces 3311 and the surface of the base plate 50 that not coated by the ink layer. An aperture of each small hole 3319 is about 30-120 nm.

A second end portion 333 of the frame 33 is formed by injection molding. In this exemplary embodiment, the solidified first end portion 331 and base plate 50 is placed in a mold (not shown). Molten plastic is injected into a cavity of the mold and solidified to from the second end portion 333 fixedly connected to the first end surfaces 3311 and the surface of the base plate that is not coated by the inker layer. In this exemplary embodiment, in the process of injecting plastic, a portion of the plastic is fixedly embedded into the small holes 3319 to form a plurality of ribs 3337 so that the second end portion 333 can stably connected the first end portion 331 and the base plate 50 together. In addition, the first end portion 331 and the second end portion 333 are closed to form the integrated frame 33.

The inker layer is removed from the base plate 50.

An outer surface of the frame 33 is processed by surface treatment such as physical vapor deposition (PVD) so that the frame can appear a better appearance.

A window portion 10 and a cover 31 are provided to cover two opposite sides of the frame 33 to form the electronic device 100.

The frame 33 of the present disclosure is formed by bending. The base plate 50 of the present disclosure is formed by casting with the frame 33 integrated with the base plate 50. Therefore, the process of making the electronic device 100 is relative simple, has high production efficiency, and also avoids a waste of material. In addition, the frame 33 formed by bending can satisfies requirement of consumers for appearance, which makes the electronic device have market competitiveness.

It is to be understood, however, that even through numerous characteristics and advantages of the present disclosure have been set forth in the foregoing description, together with details of assembly and function, the disclosure is illustrative only, and changes may be made in the details, especially in the matters of shape, size, and arrangement of parts within the principles of the disclosure to the full extent indicated by the broad general meaning of the terms in which the appended claims are expressed.

What is claimed is:

1. An electronic device comprising:
   a housing comprising a closed frame, the closed frame comprising:
      a first end portion having a first inner surface, and
      a second end portion connected to the first end portion to form the closed frame, the second end portion having a second inner surface; and
   a base plate fixedly connected to the closed frame;
   wherein one of the first inner surface and the base plate comprises a first protrusion, and the other of the first inner surface and the base plate defines a first latching slot; the first protrusion receives in the first latching slot;
   one of the second inner surface and the base plate comprises a second protrusion, and the other of the second inner surface and the base plate defines a second latching slot, the second protrusion receives in the second latching slot;
   wherein the first protrusion defines a plurality of first connecting slots, the second protrusion defines a plurality of second connecting slots, the base plate comprises a plurality of embedding portions protruding from bottoms of the first and second latching slots, the embedding portions are embedded into the first and second connecting slots.

2. The electronic device of claim 1, wherein the first end portion comprises two first end surfaces, the second end portion comprises two second end surfaces aligning with the first end surfaces.

3. The electronic device of claim 2, wherein the first end surfaces and a surface of the base plate contacted with the second end portion define a plurality of small holes, the second end portion further comprises a second inner surface, the second end surfaces and the second inner surface comprises a plurality of ribs, the ribs are fixedly embedded into the small holes.

4. The electronic device of claim 3, wherein an aperture of each small hole is about 30-120 nm.

5. The electronic device of claim 1, wherein the first end portion defines at least one gap opposite to the second end portion, two portions of the first end portion spaced by the at least one gap is separated from each other or connected by a portion of the first end portion adjacent to the at least one gap.

6. The electronic device of claim 5, wherein a width of each gap is about 1 mm-3 mm.

* * * * *